United States Patent
Li et al.

(10) Patent No.: US 12,039,976 B2
(45) Date of Patent: Jul. 16, 2024

(54) MAN- MACHINE INTERACTION SYSTEM AND MULTI-TASK PROCESSING METHOD IN THE MAN-MACHINE INTERACTION SYSTEM

(71) Applicant: HUAWEI TECHNOLOGIES CO., LTD., Guangdong (CN)

(72) Inventors: Yingtao Li, Shenzhen (CN); Xin Jiang, Hong Kong (CN); Xiao Chen, Hong Kong (CN); Baofeng Zhang, Shenzhen (CN); Li Qian, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 650 days.

(21) Appl. No.: 17/171,166

(22) Filed: Feb. 9, 2021

(65) Prior Publication Data

US 2021/0166693 A1   Jun. 3, 2021

Related U.S. Application Data

(63) Continuation of application No. PCT/CN2019/122544, filed on Dec. 3, 2019.

(30) Foreign Application Priority Data

Dec. 6, 2018   (CN) .......................... 201811489837.1

(51) Int. Cl.
*G10L 15/22*   (2006.01)
*G06F 40/35*   (2020.01)
(Continued)

(52) U.S. Cl.
CPC .............. *G10L 15/22* (2013.01); *G06F 40/35* (2020.01); *G10L 15/16* (2013.01);
(Continued)

(58) Field of Classification Search
None
See application file for complete search history.

(56) References Cited

U.S. PATENT DOCUMENTS

| | | | | |
|---|---|---|---|---|
| 7,672,932 B2 * | 3/2010 | Hood | .................. | G06F 16/3338 |
| | | | | 707/999.003 |
| 8,538,978 B2 * | 9/2013 | Rakshit | ............... | G06F 16/9535 |
| | | | | 707/767 |

(Continued)

FOREIGN PATENT DOCUMENTS

| | | | |
|---|---|---|---|
| CN | 106383815 A | 2/2017 |
| CN | 107886948 A | 4/2018 |

(Continued)

OTHER PUBLICATIONS

Translation of CN108446374B (Year: 2018).*

(Continued)

*Primary Examiner* — Richard Z Zhu
(74) *Attorney, Agent, or Firm* — WOMBLE BOND DICKINSON (US) LLP

(57) ABSTRACT

The application relates to the field of man-machine interaction in artificial intelligence and provides a multi-task processing method. The method includes the following operations: determining a first task based on request information entered by a user; obtaining key information corresponding to the first task and executing the first task, where the key information includes one or more slots and values of the one or more slots; storing task status information of the first task, where the task status information includes the key information; and predicting and initiating a second task based on the task status information of the first task. A man-machine interaction system may predict a next task based on the stored task status information, and actively initiate the predicted task. This improves intelligence and efficiency of (Continued)

multi-task processing by the man-machine interaction system.

20 Claims, 9 Drawing Sheets

(51) Int. Cl.
*G10L 15/16* (2006.01)
*G10L 15/18* (2013.01)
*G06F 40/30* (2020.01)

(52) U.S. Cl.
CPC .......... *G10L 15/1815* (2013.01); *G06F 40/30* (2020.01); *G10L 2015/223* (2013.01); *G10L 2015/227* (2013.01); *G10L 2015/228* (2013.01)

(56) References Cited

U.S. PATENT DOCUMENTS

| | | | |
|---|---|---|---|
| 8,700,653 B2 * | 4/2014 | Hansson | G06F 16/9535 707/731 |
| 10,395,655 B1 * | 8/2019 | Kumar | G10L 15/14 |
| 10,878,805 B2 * | 12/2020 | Agarwal | G06F 16/3349 |
| 10,902,533 B2 * | 1/2021 | McConnell | G06F 16/3329 |
| 11,017,764 B1 * | 5/2021 | Das | G06F 16/24578 |
| 11,288,319 B1 * | 3/2022 | Das | G06F 40/186 |
| 11,335,339 B2 * | 5/2022 | Wang | G06F 3/167 |
| 11,449,744 B2 * | 9/2022 | Chen | G06N 3/044 |
| 11,475,053 B1 * | 10/2022 | Das | G06F 16/3344 |
| 11,645,471 B1 * | 5/2023 | Das | G06F 16/243 704/9 |
| 2003/0163609 A1 | 8/2003 | Abdo et al. | |
| 2010/0076642 A1 | 3/2010 | Hoffberg et al. | |
| 2012/0158685 A1 * | 6/2012 | White | G06F 16/9535 707/723 |
| 2014/0075238 A1 | 3/2014 | Dupont et al. | |
| 2014/0136212 A1 | 5/2014 | Kwon et al. | |
| 2016/0364382 A1 | 12/2016 | Sarikaya | |
| 2018/0060793 A1 | 3/2018 | Sama et al. | |
| 2018/0255005 A1 * | 9/2018 | Agarwal | G06F 40/295 |
| 2018/0260718 A1 | 9/2018 | Biswas et al. | |
| 2018/0293497 A1 * | 10/2018 | Ravindran | G06N 3/044 |
| 2021/0142189 A1 * | 5/2021 | Subramanya | G10L 15/22 |

FOREIGN PATENT DOCUMENTS

| | | | | |
|---|---|---|---|---|
| CN | 108255934 A | | 7/2018 | |
| CN | 108446374 A | | 8/2018 | |
| CN | 108681610 A | | 10/2018 | |
| CN | 108763495 A | | 11/2018 | |
| CN | 109901896 A | | 6/2019 | |
| CN | 108446374 B | * | 9/2019 | ......... G06F 16/9537 |
| WO | 2012158571 A2 | | 11/2012 | |
| WO | 2018144052 A1 | | 8/2018 | |

OTHER PUBLICATIONS

EPO Office Action. (Year: 2023).*
SIPO Office Action (Year: 2023).*
Translated SIPO Office Action (Year: 2023).*
Li Deyi , Introduction to Artificial Intelligence, Aug. 2018, 5 pages (abstract).
Gao Zhiwei et al., Study of Human-Computer Conversation Model Based on the Natural Language in the Special Domain of Task. Journal of Shijiazhuang Railway Institute, vol. 13, No. 2, Jun. 2000, 4 pages.
Baolin Peng et al., Composite Task-Completion Dialogue Policy Learning via Hierarchical Deep Reinforcement Learning. Proceedings of the 2017 Conference on Empirical Methods in Natural Language Processing, Sep. 2017, 10 pages.

* cited by examiner

MAN-MACHINE INTERACTION SYSTEM AND MULTI-TASK PROCESSING METHOD IN THE MAN-MACHINE INTERACTION SYSTEM

CROSS-REFERENCE TO RELATED APPLICATIONS

This application is a continuation of International Application No. PCT/CN2019/122544, filed on Dec. 3, 2019, which claims priority to Chinese Patent Application No. 201811489837.1, filed on Dec. 6, 2018. The disclosures of the aforementioned applications are hereby incorporated by reference in their entireties.

TECHNICAL FIELD

This application relates to the field of man-machine interaction technologies in artificial intelligence, and in particular, to a man-machine interaction system and a multi-task processing method in the man-machine interaction system.

BACKGROUND

As the artificial intelligence technology evolves rapidly, man-machine interaction systems are in wide adoption. For example, a smart assistant has become one of the most important applications on an existing smart terminal. Common smart assistant products in the market include Apple Siri, Google Assistant, Amazon Alexa and Huawei HiVoice. The foregoing smart assistant products have respective features, but one of core functions of the smart assistant is to help a user complete a specific task through voice or text interaction, for example, making a call, setting a reminder, playing music, querying a flight status, and booking a restaurant. The foregoing task is usually initiated by the user and completed by one or more rounds of interaction with the smart assistant. By interacting with the user, the smart assistant gradually understands and confirms the user's intention and requirement, and usually completes the task by querying a database, and invoking an application programming interface (API), or the like. Each task is usually performed independently and does not affect or depend on each other.

A task-oriented spoken dialog system is one of the core technologies of the smart assistant. The task-based spoken dialog system (hereinafter referred to as "dialog system") is mostly based on a slot-filling mode. A core technology of the dialog system is to define several slots based on a task, and continuously identify the user's intention and extract related slot information during a dialog with the user. After the slot information is determined, the task can be completed. For example, in an air ticket booking task, a slot may be defined as: a departure location, a destination, a departure time, and a flight number. After the information is confirmed, the smart assistant may help a user complete the air ticket booking task.

Most of the existing smart assistants are built based on tasks. Each task has an independent slot, which can be considered as an independent dialog system. Different dialog systems run independently of each other. Generally, at an upper layer of the dialog system, a central control system is responsible for distributing a user to a specific task based on user input, and then starting a dialog for the task. In this case, only the dialog between the user and the smart assistant is involved, and each task is performed independently.

SUMMARY

According to a first aspect, the present disclosure provides a multi-task processing method in a man-machine interaction system, where the method includes the following operations: determining a first task based on request information entered by a user; obtaining key information corresponding to the first task and executing the first task, where the key information includes one or more slots and values of the one or more slots; storing task status information of the first task, where the task status information includes the key information; and predicting and initiating a second task based on the task status information of the first task.

In the method provided in the embodiments of the present disclosure, status information of each task can be shared and used. A man-machine interaction system may predict a next task based on stored task status information, and actively initiate the predicted task. This improves intelligence and efficiency of multi-task processing by the man-machine interaction system.

In an embodiment, the task status information of the first task is stored in a memory network. Using the memory network as a task memory can facilitate deep learning training.

In an embodiment, the man-machine interaction system inputs the task status information of the first task into a recurrent neural network, predicts the second task, and initiates the second task. Using the recurrent neural network to predict a task can facilitate deep learning training. Optionally, environment information may also be used as an input to predict a task. For example, an implicit status vector $h_t = f(W_x x_t + W_z z_t + W_h h_{t-1} + b)$ is calculated, where f is a transformation function, $x_t$ is a task status information vector, $z_t$ is an environment information vector, $W_x$, $W_z$ and $W_h$ are parameter matrices, and b is a parameter vector, and the second task is predicted based on the implicit status vector.

In an embodiment, the method further includes: obtaining key information corresponding to the second task based on the task status information of the first task. Optionally, the man-machine interaction system may obtain the key information corresponding to the second task in the task status information of the first task by using an attention mechanism. For example, a correlation between each slot in the task status information of the first task and the second task is calculated. In other words, an attention weight vector of each slot is calculated. The attention weight vector may be calculated according to a formula $Att = softmax(WK^T)V$. Att represents the attention weight vector, softmax represents an exponential normalization function, W is a parameter matrix, K is a vector representation of key, and V is a vector representation of value.

In an embodiment, the method further includes: performing semantic disambiguation on a dialog of the second task based on the task status information of the first task. The man-machine interaction system understands the user's intention by accessing the stored task status information. This improves intelligence and working efficiency of the man-machine interaction system.

According to a second aspect, the present disclosure provides a man-machine interaction system, including: a central control module, configured to determine a first task based on request information entered by a user, and execute the first task based on key information corresponding to the first task; a task engine module, configured to obtain the key information corresponding to the first task, where the key information includes one or more slots and values of the one or more slots; a task memory, configured to store task status information of the first task, where the task status information includes the key information; and a task controller, configured to predict and initiate a second task based on the task status information of the first task.

In an embodiment, the task memory is a memory network.

In an embodiment, the task controller is a recurrent neural network.

In an embodiment, the task engine module is further configured to obtain key information corresponding to the second task based on the task status information of the first task.

According to a third aspect, the present disclosure provides a man-machine interaction system, including a processor and a memory; where the memory is configured to store a computer-executable instruction; and the processor is configured to execute the computer-executable instruction stored in the memory, to enable the man-machine interaction system to perform the method described in the first aspect or any possible embodiment of the first aspect of the present disclosure.

According to a fourth aspect, the present disclosure provides a computer-readable storage medium, where the computer-readable storage medium stores an instruction, and when the instruction is run on a computer, the computer is enabled to perform the method described in the first aspect or any possible embodiment of the first aspect of the present disclosure.

DESCRIPTION OF EMBODIMENTS

Figure 1:
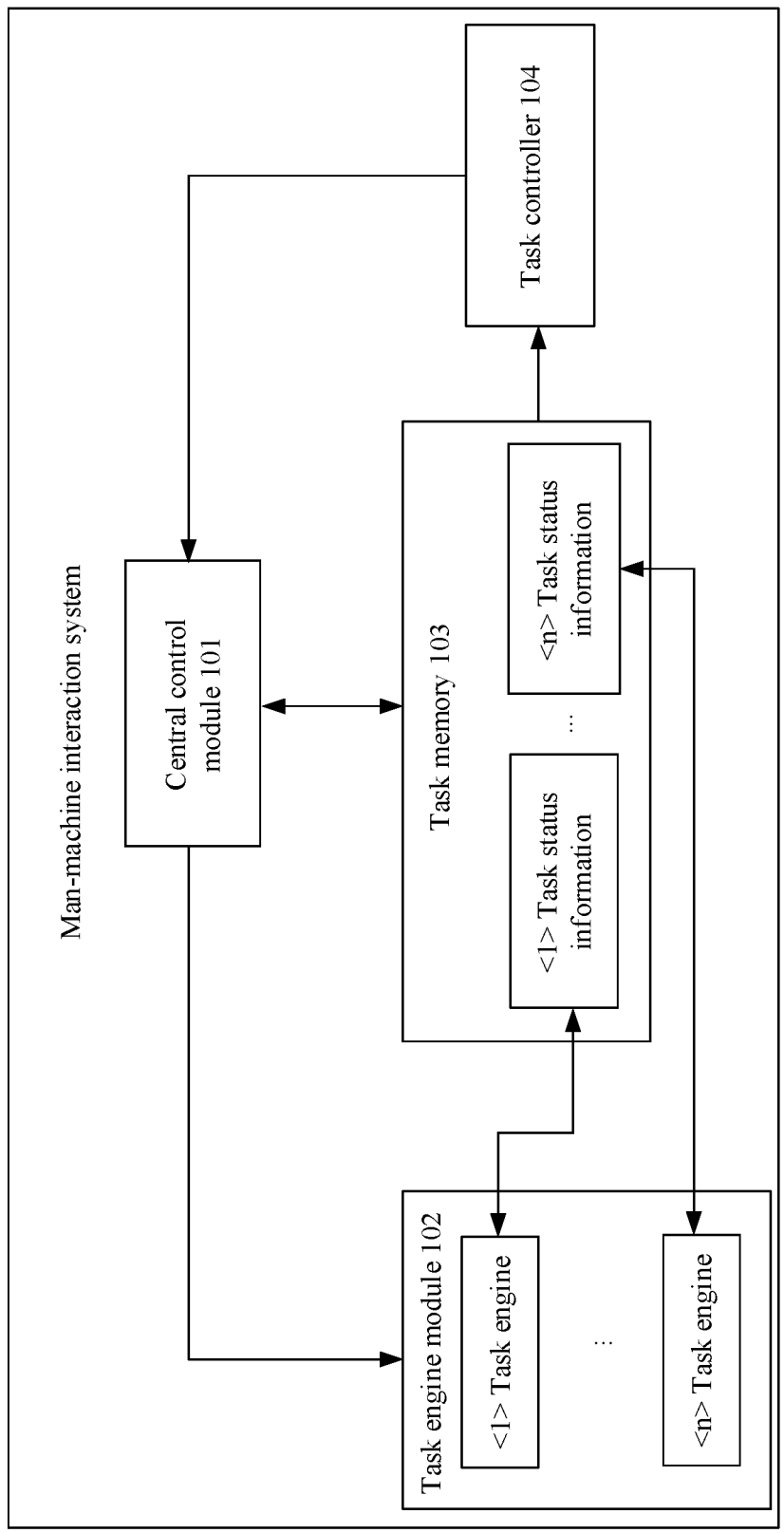
FIG. 1 is a schematic diagram of a structure of a man-machine interaction system according to an embodiment of the present disclosure.

As shown in FIG. 1, this application provides a man-machine interaction system. The man-machine interaction system mainly includes a central control module, a task engine module, a task memory, and a task controller.

The central control module 101 is configured to recognize an intention of a dialog request, determine a task, and distribute the task to a corresponding task engine.

The task engine module 102 includes a plurality of task engines. Each task engine is mainly responsible for a dialog task, and parses dialog request information to obtain key information (key-value) that meets a condition. For example, for an air ticket booking task engine, key information that meets an air ticket booking task may be extracted, such as departure location information, destination information, and time information. In addition, the task engine may store a corresponding parsing result in the task memory.

The task memory 103 is configured to store task status information, and may be accessed by a subsequent dialog, to determine an initial status and a behavior of a subsequent task. In a neural network-based dialog system, the task memory may be implemented by using a memory network, to encode task status information of each historical task, control the subsequent dialog to access related historical task status information by using an attention mechanism, and participate in determining a behavior and an output of a current dialog. Using the memory network to implement the task memory can better memorize historical task information generated a long time ago. In addition, because the attention mechanism is used to access the task memory, the system is enabled to obtain background knowledge most related to a current task.

In an embodiment of the present disclosure, the task status information includes the key information of the task, and the key information is each slot of the task and a value of each slot. The task status information may further include other information, for example, a name or an identifier of the task, whether the task is completed, or other dialog information in a task dialog process. For example, status information of a restaurant booking task is as follows:

{Task: "Book a restaurant",
City: "Shanghai",
Restaurant: "Lv Bo Lang (Yuyuan Road Store)",
Date: "2018-04-24",
Time: "7:00 p.m.",
Quantity of guests: "4"
Confirmation: "Yes"}.

The task controller 104 is configured to control sequential execution of a plurality of tasks, and determine a next possible task based on historical task status information. Optionally, the task controller may further determine the next possible task based on a dialog between the man-machine interaction system and a user in the current task and current environment information.

When predicting that the next task is not empty, the man-machine interaction system actively initiates a dialog with the user, and determines a behavior and an output of the dialog by accessing the status information stored in the task memory. When predicting that the next task is empty, the man-machine interaction system does not perform subsequent operations and waits for the user to proactively trigger a next dialog.

In an embodiment of the present disclosure, the task controller is implemented by using a Recurrent Neural Network (RNN). To be specific, the RNN is used to predict the next task based on the historical task status, the current dialog, and the current environment information. It is readily figured out that the task controller in the solutions of the present disclosure is not limited to being implemented by using the RNN, and a person skilled in the art may use another machine learning method to predict the dialog task. In this embodiment of the present disclosure, the task controller may be an independent module, or the central control module may implement a function of the task controller, namely, the task controller and the central control module are one module.

In an embodiment of the present disclosure, after the task engine module obtains the key information that meets the condition, the task engine module may execute a corresponding task based on the key information. Alternatively, the central control module may execute a corresponding task based on the key information. Alternatively, an intelligent terminal may execute a corresponding task based on the key information. Alternatively, in the man-machine interaction system, a new module is developed to execute a corresponding task based on the key information. In this application, an entity for executing the corresponding task based on the key information is not specifically limited.

It should be noted that a function of the man-machine interaction system may be implemented by a server, or may be implemented by a terminal device, or may be jointly implemented by the server and the terminal device.

In addition, the man-machine interaction system provided in this embodiment of the present disclosure uses the task memory, for example, the memory network, and the task controller, for example, the recurrent neural network RNN, to facilitate the entire system to perform deep learning training.

Figure 2:
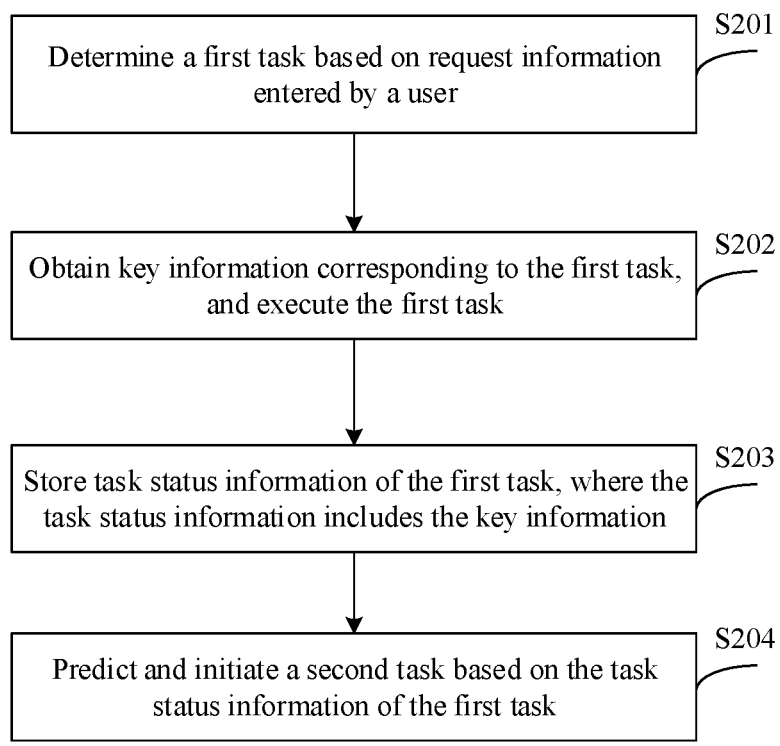
FIG. 2 is a flowchart of a multi-task processing method in a man-machine interaction system according to an embodiment of the present disclosure.

Based on the man-machine interaction system shown in FIG. 1, an embodiment of the present disclosure provides a multi-task processing method, as shown in FIG. 2. It should be noted that, in this embodiment of the present disclosure, a smart assistant is used as an example of the man-machine interaction. For ease of description, "smart assistant" is used in some descriptions to replace "man-machine interaction system". The following describes the multi-task processing method shown in FIG. 2 with reference to the example of a multi-task processing scenario in the embodiment of the present disclosure shown in FIG. 3.

Operation S201: Determine a first task based on request information entered by a user.

In an embodiment of this application, the request information may be voice information, text information, image information, or the like. The user may input the request information to an intelligent terminal, and the intelligent terminal may forward the request information to a server. In an embodiment of this application, this operation may be completed by the central control module in the man-machine interaction system shown in FIG. 1. The central control module may recognize an intention of the request information to determine the first task.

Figure 3:
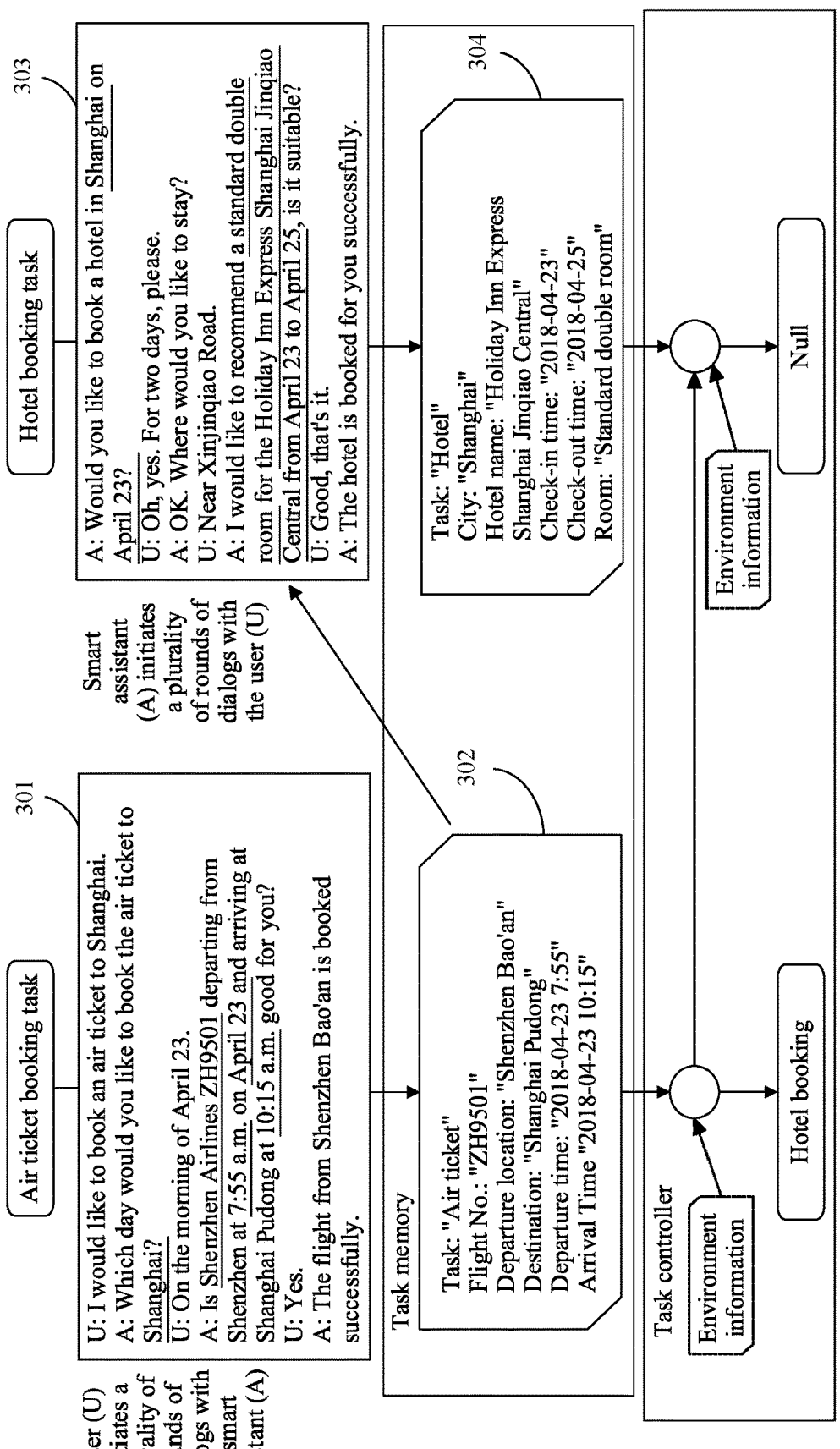
FIG. 3 is an example of a multi-task processing scenario according to an embodiment of the present disclosure.

In the example of the multi-task processing scenario shown in FIG. 3, in a dialog 301, the intelligent terminal receives a request message "I want to book an air ticket to Shanghai" entered by the user. The central control module in the man-machine interaction system determines that the first task is an "air ticket booking" task by recognizing the intention of the request message.

Operation S202: Obtain key information corresponding to the first task, and execute the first task.

In an embodiment of this application, different slots may be disposed in a task engine corresponding to each task, the slot may be specifically a variable, and a value of the slot may be specifically key information corresponding to the slot. The slot may also be referred to as an information slot, and the key information corresponding to the slot may also be referred to as slot information. The man-machine interaction system extracts the key information corresponding to each slot by using the request information and/or one or more rounds of dialogs between the smart assistant and the user. For example, the key information of the task may be obtained by a task engine module.

In the example of the multi-task processing scenario shown in FIG. 3, a task engine corresponding to the "air ticket booking" task includes slots such as a "flight number slot", a "departure location slot", a "destination slot", a "departure time slot", and an "arrival time slot". The smart assistant extracts the key information corresponding to each slot through rounds of dialogs with the user, and invokes an air ticket booking API (Application Programming Interface) based on the key information to execute the air ticket booking task.

Operation S203: Store task status information of the first task, where the task status information includes the key information.

In an embodiment of the present disclosure, the task status information may be stored in a task memory, for example, a memory network. For example, after the key information corresponding to the first task is obtained or after the first task is executed, the task status information of the first task is stored. The task status information includes the key information, and optionally may further include other information such as a task name and a task completion status.

In the example of the multi-task processing scenario shown in FIG. 3, air ticket booking task status information 302 includes the key information of the air ticket booking task, where the key information of the air ticket booking task is stored in the task memory.

Operation S204: Predict and initiate a second task based on the task status information of the first task.

In an embodiment of the present disclosure, the second task may be predicted based on the task status information of the first task by using a task controller, for example, an RNN neural network. Optionally, in addition to the task status information of the first task, a predicted input may further include environment information in which the user is located, for example, information such as a time and a geographical location. After the second task is predicted, the task controller or the central control module may initiate the second task.

In the example of the multi-task processing scenario shown in FIG. 3, after completing the "air ticket booking" task, the task controller predicts that a next task is hotel booking based on task status information corresponding to the "air ticket booking" task, and the smart assistant actively initiates a "hotel booking" task.

After the second task is initiated, the task engine module needs to obtain key information of the second task. In this embodiment of the present disclosure, by accessing the task status information of the air ticket booking task in the task memory, information most related to the second task, namely, the hotel booking task, may be calculated according to the attention mechanism. For example, destination information and arrival time information in the air ticket booking task. Based on the information, the smart assistant actively initiates a dialog interaction with the user. For example, a dialog 303 in FIG. 3 is initiated to gradually determine information such as a city, a hotel name, a check-in time, a check-out time, and a room type, namely, information of each slot of a hotel task engine, and complete the hotel booking through a hotel booking API.

In an embodiment of the present disclosure, task status information of the second task is stored, and is used as an input for predicting a next task. In the example of the multi-task processing scenario shown in FIG. 3, hotel booking task status information 304 is stored in the task memory. The task controller predicts that a next task is empty based on the hotel booking task status information 304. In other words, the next task does not need to be initiated.

In an embodiment of the present disclosure, status information of each task can be shared and used. The man-machine interaction system may predict a next task based on the stored task status information, and actively initiate the predicted task. This improves intelligence and efficiency of multi-task processing by the man-machine interaction system.

Figure 4A:
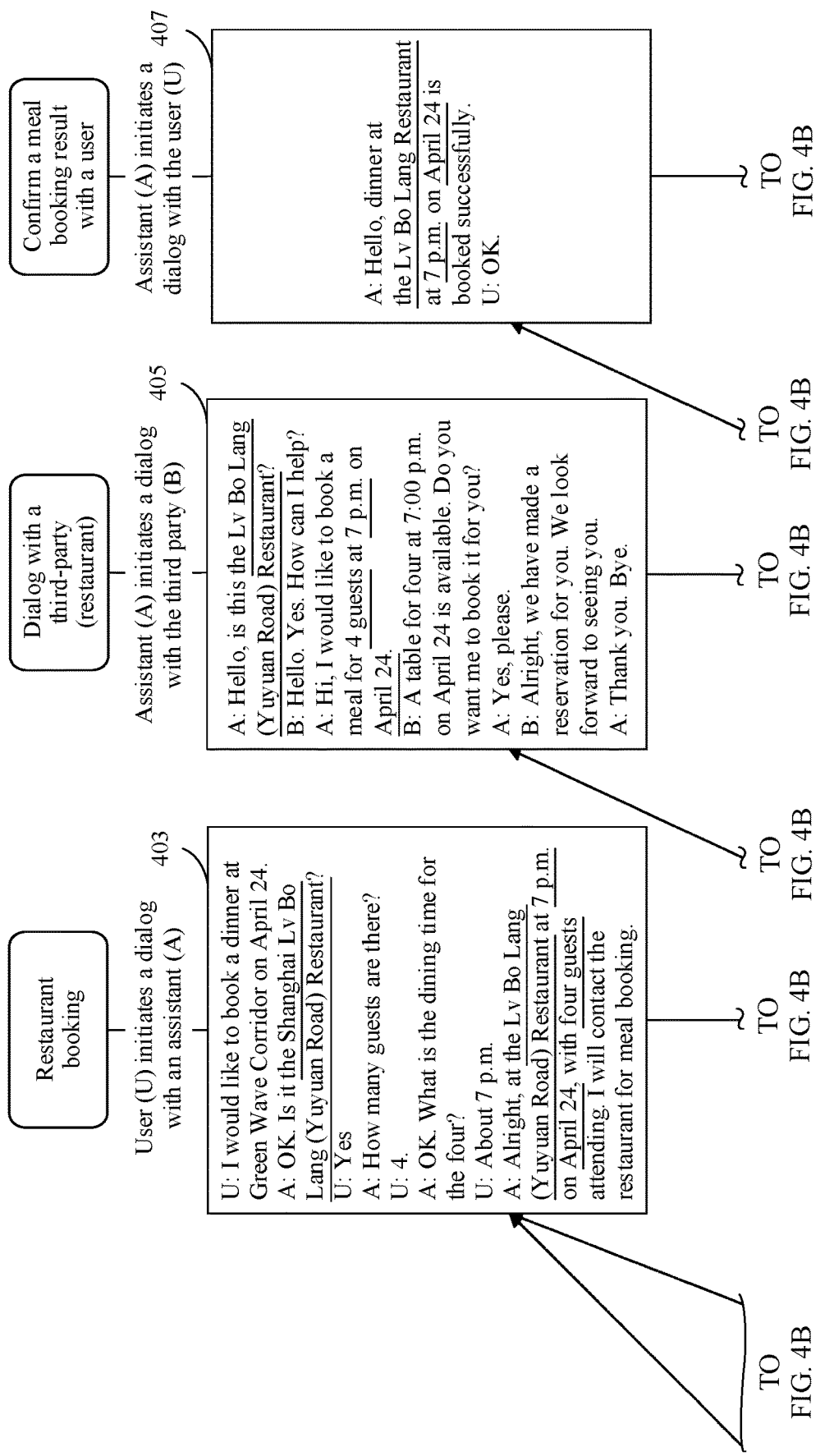
FIG. 4A and FIG. 4B are another example of a multi-task processing scenario according to an embodiment of the present disclosure.
Figure 4B:
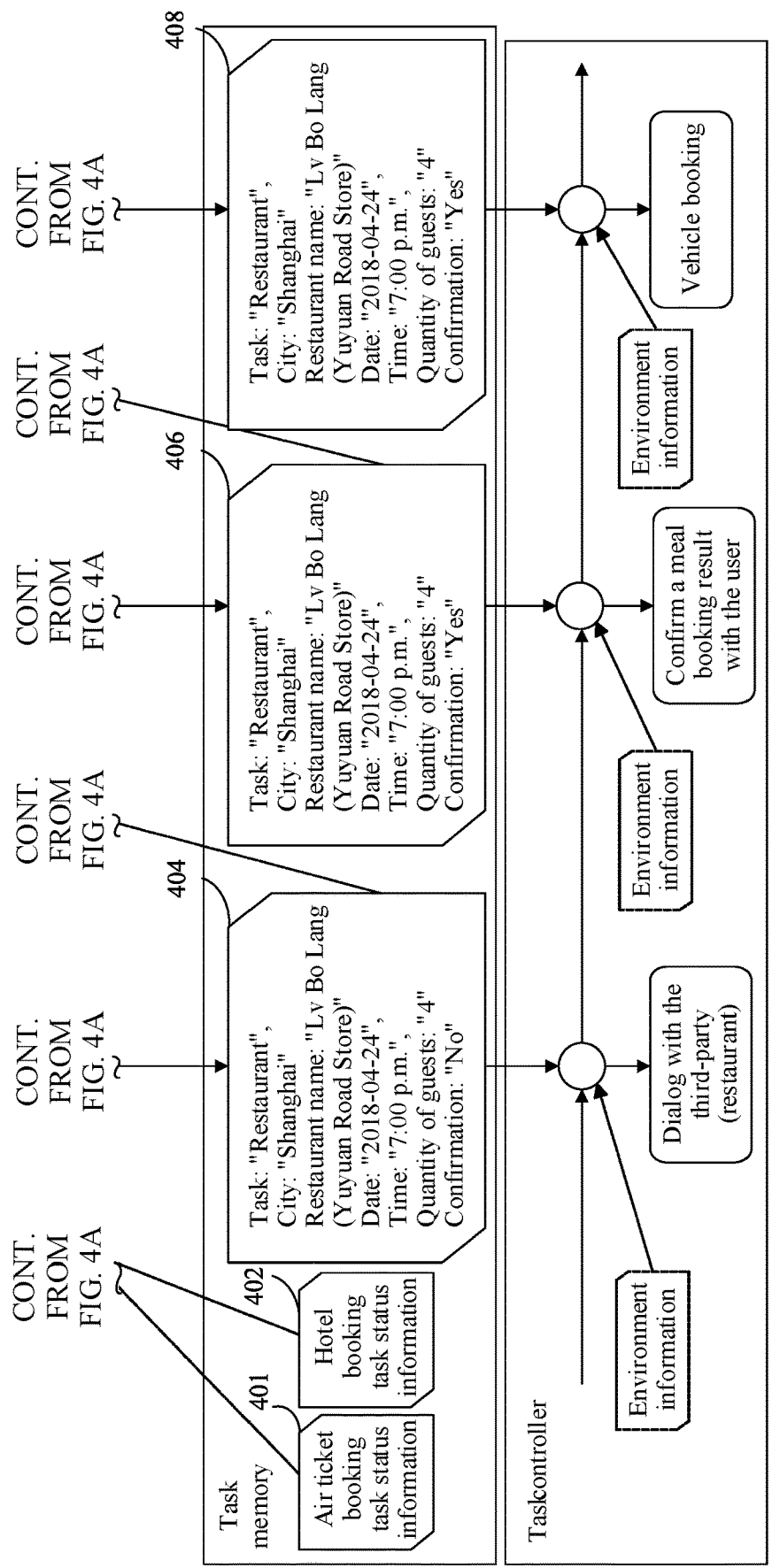

FIG. 4A and FIG. 4B show another example of a multi-task processing scenario according to an embodiment of the present disclosure. This example describes multi-task processing after the scenario shown in FIG. 3. In this example, both the air ticket booking task and the hotel booking task are completed, and corresponding air ticket booking task status information 401 and hotel booking task status information 402 are stored in a task memory. Specific implementation has been described in the foregoing embodiment. Details are not described herein again.

As shown in FIG. 4A and FIG. 4B, in a dialog 403, a user actively initiates a "restaurant booking" task, and performs rounds of dialogs with a smart assistant, to gradually determine key information of the restaurant booking task, including information such as a city, a restaurant, a date, a time, a quantity of guests, and a confirmation status. When determining the key information of the restaurant booking task, a man-machine interaction system may access the task status information of the air ticket booking task and the hotel booking task, and obtain information related to the restaurant booking task. For example, information such as the city and the time.

Then, the man-machine interaction system stores task status information 404 related to the restaurant booking task in the task memory. A task controller predicts that a next task is "a dialog with a third party (restaurant)" based on the task status information of the restaurant booking task.

As described in the foregoing embodiment, during task prediction, environment information may be further used as an input.

Subsequently, the smart assistant actively initiates a dialog 405 with the third party (restaurant) by making a phone call. In this dialog, the smart assistant accesses the task status information of the restaurant booking task to gradually determine the key information of restaurant booking and complete the restaurant booking.

After the restaurant is booked, the man-machine interaction system updates the task status information of the restaurant booking task in the task memory, and changes the confirmation status information in the task status information from "no" to "yes", to obtain updated task status information 406. Then, the task controller predicts that a next task is "confirming a meal booking result with the user". The smart assistant initiates a dialog 407 with the user to notify the user that the restaurant has been booked. After "confirming the meal booking result with the user" is completed, the corresponding task status information does not need to be updated. In this case, task status information 408 is consistent with the task status information 406. Then, the task controller predicts that a next task is "booking a vehicle" based on the stored task status information. Key information obtaining and task execution of the vehicle booking task are similar to those of the foregoing tasks. Details are not described herein again.

In an embodiment, the man-machine interaction system may predict a next task based on the stored task status information, and actively initiate a dialog with a third party. This improves intelligence and efficiency of multi-task processing by the man-machine interaction system.

Figure 5:
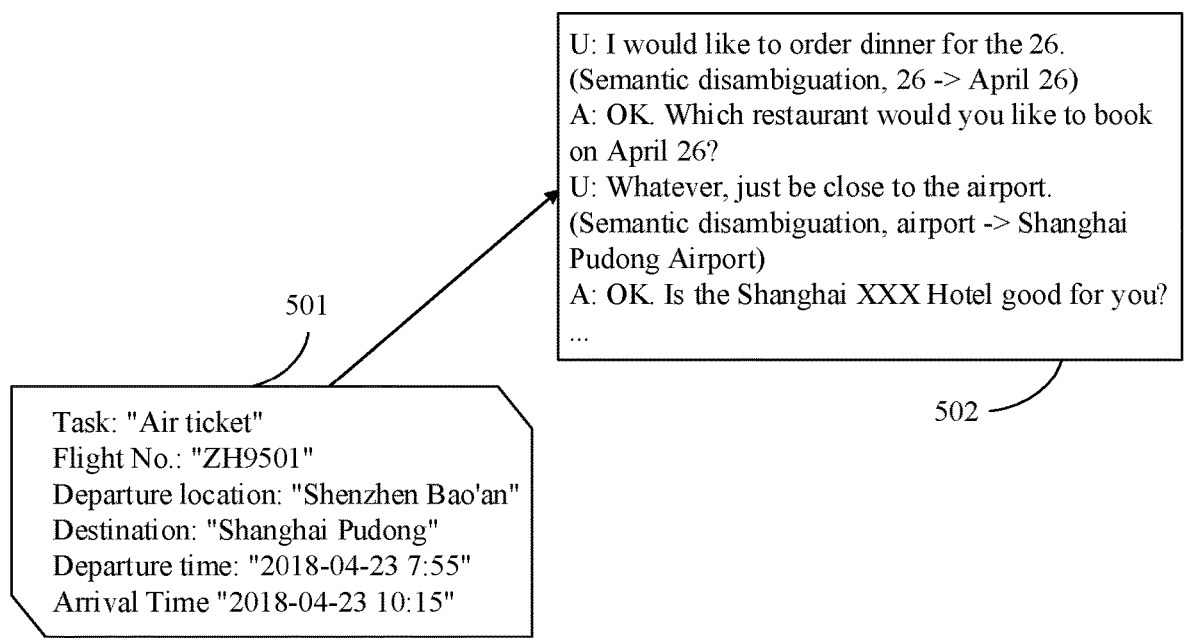
FIG. 5 is an example of performing semantic disambiguation on a current task statement based on historical task status information according to an embodiment of the present disclosure.

In the method provided in this embodiment of the present disclosure, the stored task status information may be accessed by a subsequent task. Therefore, the man-machine interaction system may further understand the user's intention with the assistance of historical task status information, for example, semantic disambiguation on a current dialog statement. As shown in FIG. 5, FIG. 5 is an example of performing semantic disambiguation on a current task statement based on historical task status information. In this example, a current task is a restaurant booking task, and a man-machine interaction system performs the semantic disambiguation on a restaurant booking task dialog 502 by using an attention mechanism and based on task status information 501 of a historical air ticket booking task adjacent to the current task.

In the dialog 502, when initiating the restaurant booking task, a user directly says booking a dinner on the 26th. The man-machine interaction system obtains that a current month is April based on departure time and arrival time information in the task status information of the air ticket booking task. Therefore, the man-machine interaction system understands that a specific date expected by the user is April 26th. Subsequently, the user requests that a restaurant location be close to an airport. The man-machine interaction system infers that an organization name after the disambiguation is Shanghai Pudong Airport based on destination information "Shanghai Pudong" in the task status information of the air ticket booking task.

In an embodiment of the present disclosure, the man-machine interaction system understands a user intention by accessing stored task status information. This improves intelligence and working efficiency of the man-machine interaction system.

The foregoing embodiment of the multi-task processing method describes the man-machine interaction system. For example, a task engine module in the man-machine interaction system may access the task status information stored in a task memory, and determine information related to the current task according to the attention mechanism, and further generate an action of a current dialog and a subsequent statement. The following describes in detail with reference to an example of accessing historical task status information in the embodiment of the present disclosure shown in FIG. 6.

Figure 6:
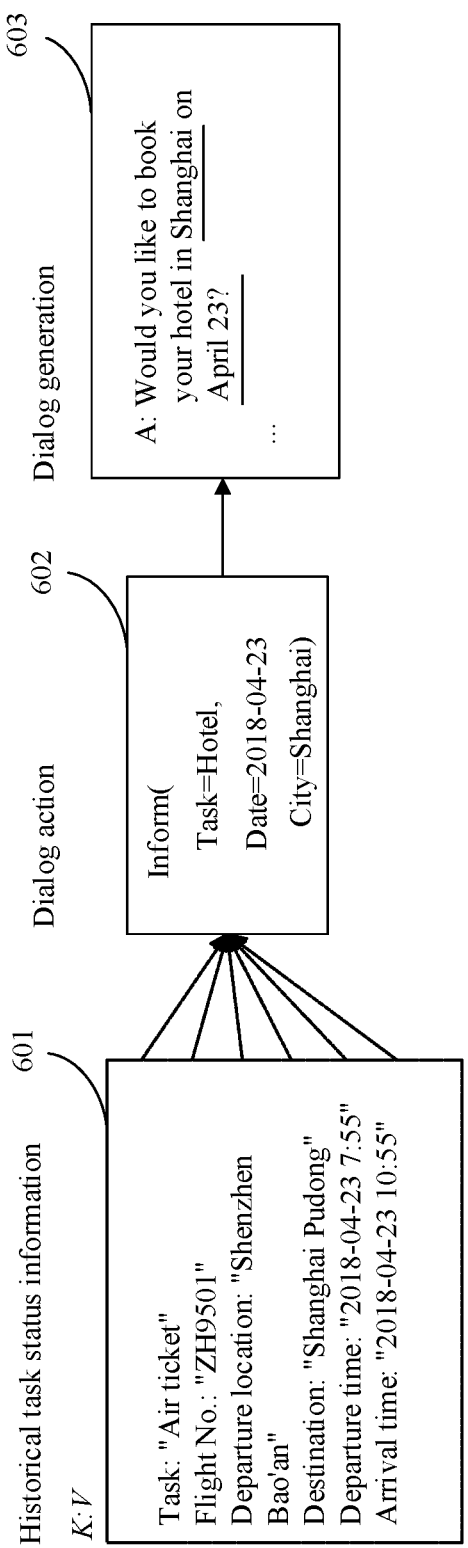
FIG. 6 is an example of accessing historical task status information according to an embodiment of the present disclosure.

In the example shown in FIG. 6, task status information 601 of an air ticket booking task is stored in a task memory in a form of key-value (key information), where the key represents a slot, and value represents a specific value of the slot. The task status information 601 of the air ticket booking task includes slots such as a "flight number slot", a "departure location slot", a "destination slot", a "departure time slot", and an "arrival time slot", and values of the slots. In a memory network, the key information is represented as an embedding vector.

In a current hotel booking task, a man-machine interaction system calculates a correlation between each slot in the task status information of the air ticket booking task and the current task by using an attention mechanism. In other words, an attention weight vector of each slot is calculated. For example, the attention weight vector may be calculated according to a formula $Att = \text{softmax}(WK^T)V$. Att represents the attention weight vector, softmax represents an exponential normalization function, W represents a model parameter, K is a vector representation of key, and V is a vector representation of value.

As shown in FIG. 6, in the task status information of the air ticket booking task, a slot that is related to a hotel booking task is an arrival location and an arrival time determines a city where a hotel is located and a check-in time to some extent. The man-machine interaction system determines an action 602 of a current dialog: Inform (Task=Hotel, Date=2018-04-23, City=Shanghai) based on the attention weight vector and specific key-value information. The action indicates asking a user whether to book a hotel in Shanghai on Apr. 23, 2018. Then, the man-machine interaction system may generate a natural language by using a corresponding module, for example, a language generation module, to initiate a dialog 603: "Would you like to book your hotel in Shanghai on April 23?" The prior art may be used for natural language generation in the man-machine interaction system. Details are not described herein.

In an embodiment, the man-machine interaction system confirms information related to the current task in the historical task status information by using the attention mechanism, therefore the man-machine interaction system is more focused and more efficient in using the historical task status information.

Figure 7:
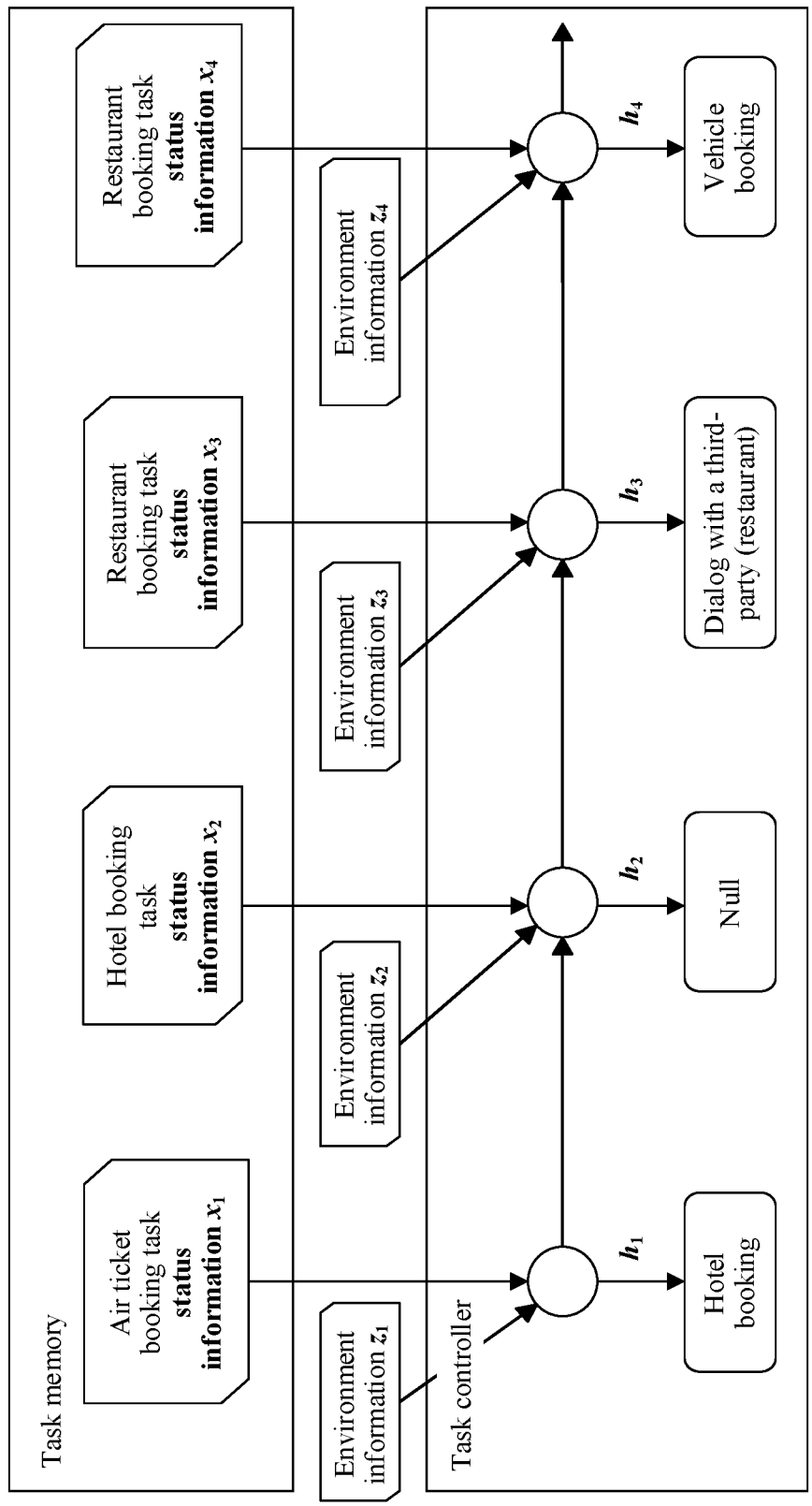
FIG. 7 is an example of predicting a task by a task controller according to an embodiment of the present disclosure.

The foregoing embodiment of the multi-task processing method describes that a task controller may predict a next task based on stored task status information. In an embodiment, the task controller may further perform prediction with reference to environment information. FIG. 7 shows an example of predicting a task by a task controller according to an embodiment of the present disclosure.

In this example, the task controller is implemented by using a recurrent neural network RNN. For each task, task status information of the task $x_t$ and environment information in which a user is located $z_t$ are input into the recurrent neural network. A current implicit status vector $h_t$ is calculated based on a historical hidden status vector $h_{t-1}$, and then a next task is predicted based on the current hidden status vector $h_t$, and so on.

In an example, the implicit status vector $h_t$ may be calculated according to a formula $h_t=f(W_x x_t + W_z z_t + W_h h_{t-1} + b)$. f is a transformation function, for example, a sigmoid function or a ReLU function, $W_x$, $W_z$ and $W_h$ are parameter matrices, and are respectively multiplied by the task status information $x_t$, the environment information $z_t$, and the historical implicit status vector $h_{t-1}$, and b is a parameter vector.

The foregoing embodiment has described in detail how the man-machine interaction system shown in FIG. 1 completes the multi-task processing method shown in FIG. 2. A person skilled in the art can understand that a structure of the man-machine interaction system shown in FIG. 1 is an example. For example, division into the modules is merely logical function division and may be another division in actual implementation. For example, functional modules described in the embodiments of the present disclosure may be integrated into one processing module, or each of the modules may exist alone physically, or two or more modules are integrated into one module, or one or more modules are integrated into another device. The foregoing modules may be implemented in a form of hardware, or may be implemented in a form of a software functional module.

When the modules are implemented in the form of a software functional module and sold or used as an independent product, the modules may be stored in a computer-readable storage medium. Based on such an understanding, the technical solutions of the present disclosure essentially, or the part contributing to the prior art, or all or some of the technical solutions may be implemented in a form of a software product. The software product is stored in a storage medium and includes several instructions for enabling a computer device (which may be a personal computer, a server, or a network device) to perform all or some of the operations in the methods described in the embodiments of the present disclosure. The foregoing storage medium includes any medium that can store program code, such as a USB flash drive, a removable hard disk, a Read-Only Memory (ROM), a Random Access Memory (RAM), a magnetic disk, or an optical disc.

Figure 8:
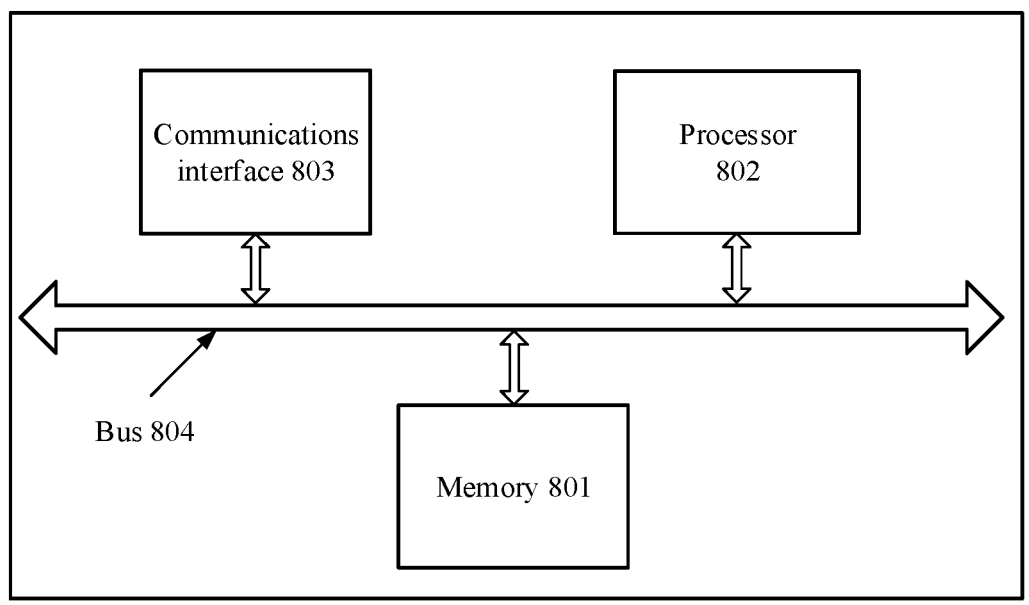
FIG. 8 is a schematic diagram of a hardware structure of a man-machine interaction system according to an embodiment of the present disclosure.

FIG. 8 is a schematic diagram of a hardware structure of a man-machine interaction system according to an embodiment of the present disclosure. The man-machine interaction system shown in FIG. 8 includes a memory 801, a processor 802, a communications interface 803, and a bus 804. A communication connection between the memory 801, the processor 802, and the communications interface 803 is implemented through the bus 804.

The memory 801 may be a Read-only Memory (ROM), a static storage device, a dynamic storage device, or a Random Access Memory (RAM). The memory 801 may store a program. When the program stored in the memory 801 is executed by the processor 802, the processor 802 and the communications interface 803 are configured to perform the operations in the foregoing method embodiments.

In an example, the processor 802 may use a general-purpose Central Processing Unit (CPU), a Digital Signal Processing (DSP), an Application-specific Integrated Circuit (ASIC), a Graphics Processing Unit (GPU), a Field Programmable Gate Array (FPGA), or one or more integrated circuits. The processor 802 is configured to execute a related program, to implement modules in the man-machine interaction system provided in the foregoing embodiments, for example, a central control module, a task engine module, a task memory, and a task controller, and a function that needs to be executed, or perform operations in the foregoing multi-task processing method embodiments, for example, operation S201 to operation S203.

In another example, the processor 802 may alternatively be an integrated circuit chip and has a signal processing capability. In an implementation process, operations of the multi-task processing method provided in the foregoing embodiments may be completed by using a hardware integrated logic circuit in the processor 802 or an instruction in a form of software.

The communications interface 803 uses a transceiver apparatus, for example, but not limited to, a transceiver, to implement communication between the man-machine interaction system and another device or a communications network.

The bus 804 may include a path for transmitting information between components of the man-machine interaction system.

A person skilled in the art may clearly understand that, for the purpose of convenient and brief description, for a detailed working process of the system and module described in this application, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A multi-task processing method in a man-machine interaction system, the method comprising:
   determining a first task based on request information entered by a user;
   obtaining key information corresponding to the first task, wherein the key information comprises one or more slots and values of the one or more slots;
   executing the first task;
   storing task status information of the first task comprising the key information; and
   predicting and initiating a second task based on the task status information of the first task, wherein predicting the second task comprises:
   predicting, based on an implicit status vector $h_t$, the second task, wherein $h_t=f(W_x x_t + W_z z_t + W_h h_{t-1} + b)$, f is a transformation function, $x_t$ is a task status information vector, $z_t$ is an environment information vector, $h_{t-1}$ is a historical implicit status vector, $W_x$, $W_z$ and $W_h$ are parameter matrices, and b is a parameter vector.

2. The method according to claim 1, wherein the task status information of the first task is stored in a memory network.

3. The method according to claim 1, wherein the predicting and initiating a second task comprises:
   inputting the task status information of the first task into a recurrent neural network.

4. The method according to claim 3, wherein the inputting the task status information of the first task into a recurrent neural network comprises:
   inputting the task status information of the first task into the recurrent neural network to obtain the implicit status vector $h_t$ through calculation.

5. The method according to claim 1, further comprising:
   obtaining key information corresponding to the second task based on the task status information of the first task.

6. The method according to claim 5, wherein the obtaining key information corresponding to the second task comprises: obtaining, by using an attention mechanism, the key information corresponding to the second task in the task status information of the first task.

7. The method according to claim 6, wherein the obtaining the key information corresponding to the second task in the task status information of the first task comprises:
   determining, based on an attention weight vector of a slot in the key information of the first task, a correlation between the one or more slots and the second task; and
   obtaining the key information corresponding to the second task, wherein the attention weight vector $Att=softmax(WK^T)V$, softmax is an exponential normalization function, W is a parameter matrix, K is a vector representation of the slot, and V is the vector representation of a value of the slot.

8. The method according to claim 1, further comprising:
   performing semantic disambiguation on a dialog of the second task based on the task status information of the first task.

9. A man-machine interaction system, comprising:
   a memory to store a computer-executable instruction; and
   a processor to execute the computer-executable instruction stored in the memory, to cause the man-machine interaction system to perform operations, the operations including:
   determining a first task based on request information entered by a user;
   obtaining the key information corresponding to the first task, wherein the key information comprises one or more slots and values of the one or more slots;
   executing the first task storing task status information of the first task comprising the key information; and
   predicting and initiating a second task based on the task status information of the first task, wherein predicting the second task comprises:
   predicting, based on an implicit status vector $h_t$, the second task, wherein $h_t=f(W_x x_t + W_z z_t + W_h h_{t-1} + b)$, f is a transformation function, $x_t$ is a task status information vector, $z_t$ is an environment information vector, $h_{t-1}$ is a historical implicit status vector, $W_x$, $W_z$ and $W_h$ are parameter matrices, and b is a parameter vector.

10. The man-machine interaction system according to claim 9, wherein the task status information of the first task is stored in a memory network.

11. The man-machine interaction system according to claim 9, wherein the operations further comprise:
    inputting the task status information of the first task into a recurrent neural network.

12. The man-machine interaction system according to claim 11, wherein the operations further comprise calculating the implicit status vector $h_t$.

13. The man-machine interaction system according to claim 9, wherein the operations further comprise obtaining, based on the task status information of the first task, key information corresponding to the second task.

14. The man-machine interaction system according to claim 13, wherein the operations further comprise obtaining, by using an attention mechanism, the key information corresponding to the second task in the task status information of the first task.

15. The man-machine interaction system according to claim 14, wherein the operations further comprise:
    determining, based on an attention weight vector of a slot in the key information of the first task, a correlation between the one or more slots and the second task; and
    obtaining the key information corresponding to the second task, wherein the attention weight vector may be obtained through calculation according to a formula $Att=softmax(WK^T)V$, wherein Att represents the attention weight vector, softmax represents an exponential normalization function, W represents a model parameter, K is a vector representation of the slot, and V is a vector representation of the value of the slot.

16. A non-transitory computer-readable storage medium having instructions stored therein, which when executed by a processor, cause the processor to perform operations, the operations comprising:
    determining a first task based on request information entered by a user;
    obtaining key information corresponding to the first task, wherein the key information comprises one or more slots and values of the one or more slots;
    executing the first task storing task status information of the first task comprising the key information; and
    predicting and initiating a second task based on the task status information of the first task, wherein predicting the second task comprises:
    predicting, based on an implicit status vector $h_t$, the second task, wherein $h_t=f(W_x x_t + W_z z_t + W_h h_{t-1} + b)$, f is a transformation function, $x_t$ is a task status information vector, $z_t$ is an environment information vector, $h_{t-1}$ is a historical implicit status vector, $W_x$, $W_z$ and $W_h$ are parameter matrices, and b is a parameter vector.

17. The computer-readable storage medium according to claim 16, wherein the task status information of the first task is stored in a memory network.

18. The computer-readable storage medium according to claim 16, wherein the predicting and initiating a second task comprises:
   inputting the task status information of the first task into a recurrent neural network.

19. The computer-readable storage medium according to claim 16, wherein the operations further comprise:
   obtaining key information corresponding to the second task based on the task status information of the first task.

20. The computer-readable storage medium according to claim 16, wherein the operations further comprise:
   performing semantic disambiguation on a dialog of the second task based on the task status information of the first task.

\* \* \* \* \*